Dec. 9, 1958  G. GLUCHOWICZ  2,863,705
GUIDE MEANS FOR MACHINE PARTS

Filed April 4, 1956  4 Sheets-Sheet 1

Inventor:
Gerszon Gluchowicz
By: [signature]
Attorney

Dec. 9, 1958  G. GLUCHOWICZ  2,863,705
GUIDE MEANS FOR MACHINE PARTS
Filed April 4, 1956  4 Sheets-Sheet 2
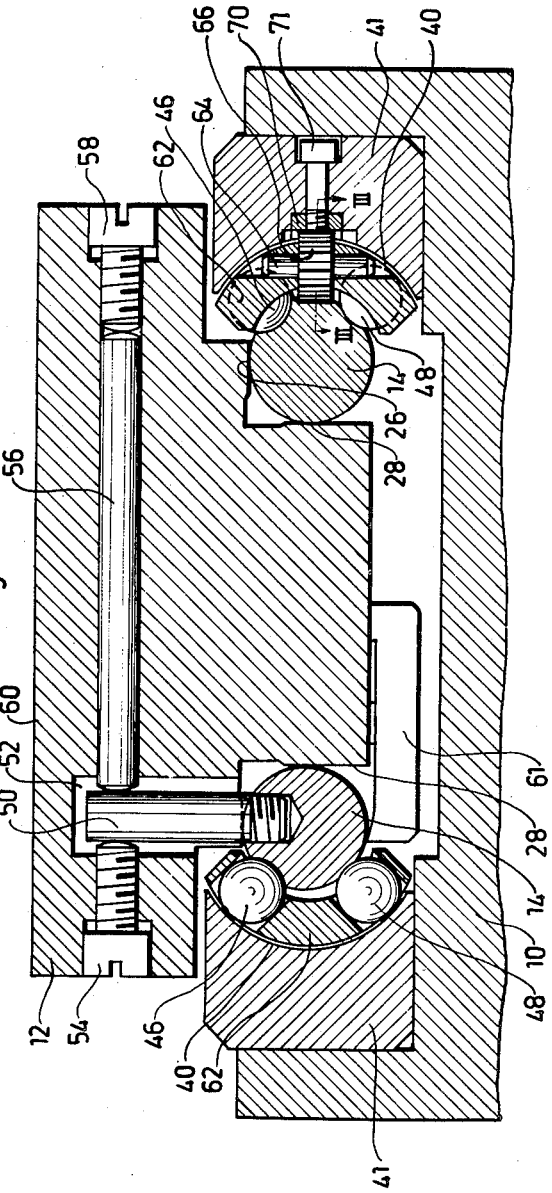
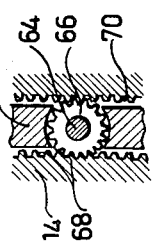
Inventor:
Gerszon Gluchowicz
By: *signature*
Attorney Dec. 9, 1958  G. GLUCHOWICZ  2,863,705
GUIDE MEANS FOR MACHINE PARTS
Filed April 4, 1956  4 Sheets-Sheet 3

Inventor:
Gerszon Gluchowicz
By: [signature]
Attorney

Dec. 9, 1958     G. GLUCHOWICZ     2,863,705
GUIDE MEANS FOR MACHINE PARTS
Filed April 4, 1956     4 Sheets-Sheet 4

Inventor:
Gerszon Gluchowicz
By: [signature]
Attorney

//  # United States Patent Office 2,863,705  
Patented Dec. 9, 1958

2,863,705
GUIDE MEANS FOR MACHINE PARTS

Gerszon Gluchowicz, Hagersten, Sweden, assignor to Ulvsunda Verkstäder Aktiebolag, Bromma, Sweden, a joint-stock company of Sweden Application April 4, 1956, Serial No. 576,050

Claims priority, application Sweden April 7, 1955

10 Claims. (Cl. 308—6)

This invention relates to guides adapted to support and guide a carriage relatively to a substructure.

More particularly this invention relates to guides adapted to support and guide a carriage or slide relatively to a substructure such as a frame of a machine and preferably a machine tool.

In machines of the kind in consideration the carriage or slide performs a rectilinear forward and return travel in the frame, the guiding being provided between said parts and formed with guiding and bearing surfaces. In known constructions the guides usually are provided with plane sliding and guiding surfaces requiring a meticulous finishing work. The guides may comprise prisms, V-slots and like longish plane surfaces to provide for the lateral guiding.

Nowadays also rolling guides of various kinds have been used. These rolling bearings are provided with rows of rolling bodies of a ball or roller shape located between internal and external roller ways of hardened steel provided on the movable and stationary parts of the machine, respectively. Heavy machine tables or slides as a rule rest by their own weight on three plane surfaces or on two rows of ball or roller bearings. Possibly created forces tending to raise the table from the bed or the frame are in such machines substantially smaller than the weight of the table. In lighter machines, where the own weight of the table or slide is insufficient to neutralize the upwardly directed forces, at least four supporting and bearing surfaces will have to be incorporated, as a rule.

To answer claims for accurate setting and prestressing of the slide conical rules are resorted to, said rules having a boundary surface forming an angle to the direction of movement and conforming to a corresponding conical surface in the stationary part of the machine.

These known constructions have several disadvantages of mechanical and economic character. It is expensive to attain the requisite precision in the manufacture of the plane surfaces. In connection with guides adapted to guide from all sides and provided with ball bearings, a sliding movement between the balls and the roller ways is inevitable and results in an appreciable wear. Rollers make still greater demands upon the manufacturing accuracy with respect to the roller ways to avoid edgewise pressing and oblique positioning of the rollers apt to cause a rapid wear of the bearings. The prestressing of the roller bodies is frequently of a magnitude of a few thousandths of a millimeter, which involves that the construction becomes very expensive, particularly as far as the conical rules are concerned. Another disadvantage inherent in the usual guides is constituted by the necessity of orientating at least one plane of the table or the slide in parallel or perpendicularly to the direction of movement within narrow allowances that cannot be laid down in the course of the manufacture but have to be adjusted during the actual erection of the machines. Such a progress of work is time-wasting and expensive.

One main object of the invention is to provide a guide permitting an accurate and uniform setting along the whole bearing without requiring any conical setting surfaces.

Another object of the invention is to provide a guide adapted to facilitate trueing up of the slide or table relatively to the substructure in a simple manner both during the actual assembling of the machine and later whenever the initial trueing should change due to non-symmetrical loading or deformations through aging.

Further objects and advantages of the invention will become apparent from the following description considered in connection with the accompanying drawings which form part of this specification and of which:

Fig. 2 is a cross sectional view of a frame and a table of a machine comprising guides of the type shown in Fig. 1 inserted therebetween.

Fig. 3 is a sectional view following line III—III of Fig. 2.

Figure 1:
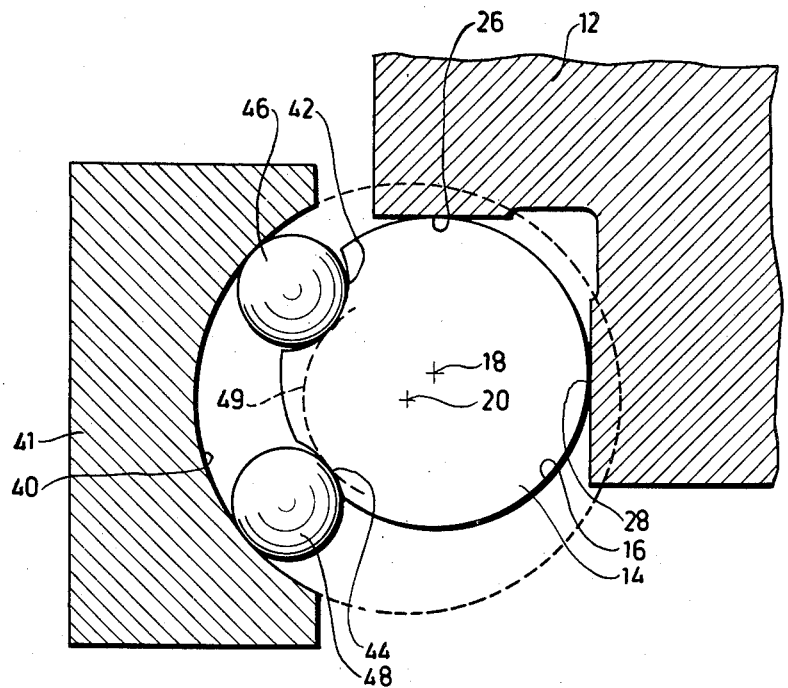
Fig. 1 is a cross sectional view of a portion of a guide constructed according to one embodiment of the invention.

Referring to the drawings, reference numeral 10 designates part of the stationary frame of a machine tool, reference numeral 12 denoting part of a table or slide carried by said frame, said table or slide being adapted to travel back and forth along a rectilinear path on the frame by means of two guides constructed in accordance with the invention, the direction of travel being transversal to the plane of the drawing. Disposed between the two parts 10 and 12 are two rods 14, the rods shown in the embodiment illustrated in Figs. 1 and 2 having over their entire circumference a cylindrical surface 16 with its center line indicated by the point 18. The surface 16 bears on two supporting surfaces 26, 28 located perpendicularly to one another for instance on the slide 12. Said supporting surfaces are preferably plane. A member 41 connected to the frame 10 has a surface 40, forming part of a cylinder following the dashed line shown in Fig. 1 and the center 20 of which is located eccentrically relatively to the center 18 of the surface 16. Provided in the rod 14 are two longitudinally extending roller ways 42, 44, each for a row of balls 46 and 48, respectively. In the embodiment shown the balls of the two rows are mutually of the same size and co-operate with the stationary cylinder surface 40. Due to the eccentricity between the surfaces 16 and 40, the cylindrical roller way 42 will thus have a greater depth than the roller way 44 in the rod 14 so as to cause a circle 49 with a center point 20 to touch both roller ways.

The center 18 of the surface 16 is located between the center 20 and the slide 12 and at the same time above the latter center as will be seen from Fig. 1. Assuming the rod 14 being turned in a clockwise direction according to the figure, the surface 16 thereof because of the eccentricity between the centers of the surfaces 16 and 40 or 49, respectively, will approach the supporting surface 28 of the slide and simultaneously retreat from the supporting surface 26. It is further assumed that the slide 12 is movable horizontally. A corresponding guide is provided at the right hand side thereof, as will be seen from Fig. 2. Said turning movement of the rod 14 then results in that the slide is braced between the vertical surfaces 28, the adjustment of the height of said slide being determined by the contact between the cylinder surface 16 and the supporting surface 26. If the slide 12 has an upper surface (60, Fig. 2) to be trued up in a predetermined, for example horizontal position, the adjustment may be effected simply by turning the two rods 14 over different degrees. If the one side of the slide is located at too high a level, the rod 14 is turned on the same side for a suitable distance in a clockwise direction, while the rod 14 on the other side of the slide at the same time is turned for a suitable distance in a counter-clockwise direction. In other words, an exact trueing of the slide will be effected simultaneously with its bracing at the supporting surfaces 28 in order to attain the desired lateral guidance. The rods 14 follow with the slide in its reciprocating displacement on the frame or bed 10, the balls 46 and 48 then rolling on the surfaces 40, 42 or 44, respectively. The power required to move the slide during operation of the machine along the frame or bed will thus become very insignificant.

By varying the position of the two centers 18, 20 relatively one another various combinations for the trueing and the lateral setting of the slide are obtainable. If the two centers are located on the same vertical line and the rod 14 is turned, the movement in a lateral direction relative to the supporting surfaces 28 obviously will be great for a certain angle the vertical position of the supporting surface 26 remaining practically unchanged. The reverse condition presents itself if the two centers 18 and 20 are on a horizontal line. Between these limit values a great number of intermediate positions are available.

As will be seen from Fig. 2, the slide 12 is equipped with two guides of the type shown in Fig. 1. A horizontal supporting surface 26 and a vertical supporting surface 28 on the slide 12 correspond to each rod 14, said supporting surfaces extending vertically to one another. Fig. 2 also shows an embodiment of a device intended for individual turning of the rods 14. Each rod is thus actuated by one such device. It comprises a pin 50 threaded into the rod 14 and entering with a play into a bore 52 provided in the slide 12. Bearing on one side of the pin 50 is a screw 54 accessible from outside the device, and bearing on the other side thereof is a pin 56 bearing in turn on a screw 58 accessible from outside the device and threaded into the opposite lateral surface of the slide. The screw 54 and the pin 56 may have rounded bearing surfaces abutting against the pin 50. By loosening one of the screws 54 and 58 and by screwing down the other of said screws, the pin 50 will turn the rod 14 about the center 20 and cause the upper surface 60 of the slide to be trued up relatively to the horizontal plane, said slide at the same time being set against the supporting surfaces 28 due to the pressure of the rods 14. The rods 14 are mounted to move with the slide 12, while the two rows of balls 46 and 48 roll on the surface 40. The rods are locked in the desired positions by means of clamping members 61.

The balls 46 and 48 are inserted into a common retainer 62, comprising a gear wheel 66 mounted on a pin 64 and having its teeth engaging straight toothed racks 68, 70 provided on the rod 14 and the stationary member 41, respectively. The axial movement of the retainer 62 and the balls is thus synchronized with the movement of the rod 14 in a manner ensuring the balls always to maintain their proper positions. The tooth rack 70 is retained by means of screws 71.

Figure 4:
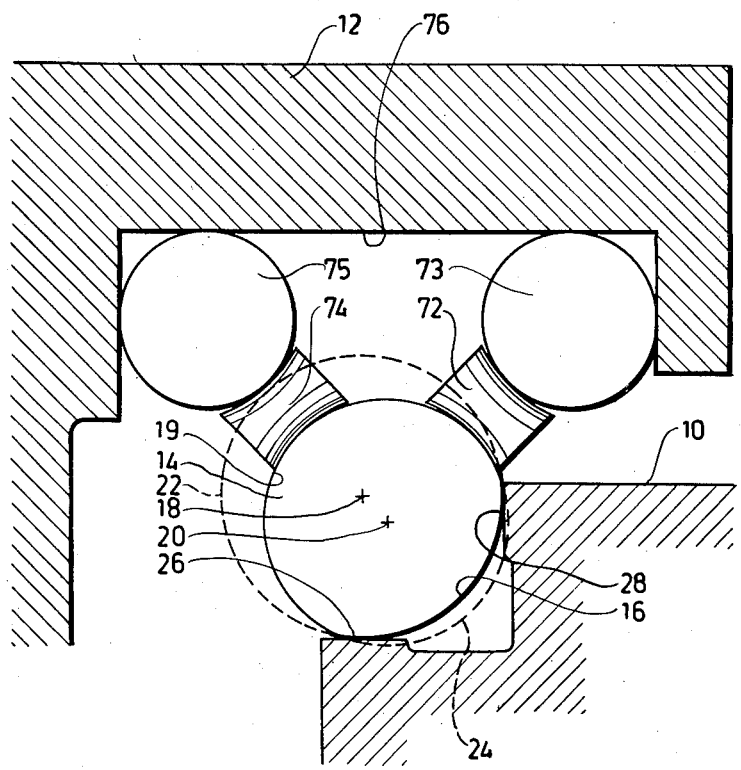
Figs. 4 and 5 are cross sectional views of guides constructed according to two further embodiments of the invention.

In the embodiment shown in Fig. 4, the rod 14 is provided over a portion of its circumference with a cylindrical surface 16 having its center located in the point 18, and over another portion of its circumference with a cylindrical surface 19, the center 20 of which surface 19 is eccentrically located relatively to the point 18. The two surfaces 16 and 19 thus constitute parts of cylinders according to the dash lines 22 and 24, respectively. The surface 16 bears on the supporting surfaces 26, 28 located on the frame 10. Rollers 72, 74 provided in concave rolling tracks roll on the one hand on the surface 19 and on the other hand on cylindrical rods 73 and 75, respectively. These rods bear on perpendicularly set surfaces formed by a recess 76 in the member 12. The adjustment of the guides is effected in the manner described hereinbefore in connection with the Fig. 1. The displacement of the slide is effected with a rolling motion of the rollers 72 and 74.

Figure 5:
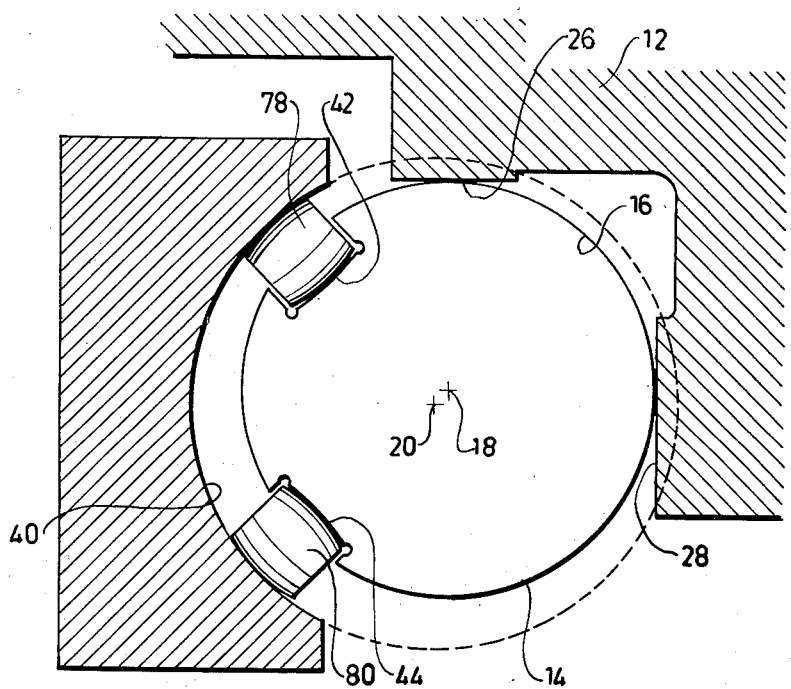

The embodiment according to Fig. 5 is in conformity with that presented in Fig. 1 but for the balls 46, 48 replaced by rollers 78, 80 having a carrying capacity surpassing that of the balls.

The balls 46, 48 and the rollers 78, 80, respectively, may have mutually different diameters.

While several more or less specific embodiments of the invention have been described it is to be understood that this is for the purpose of illustration only, and that the invention is not to be limited thereby, but that its scope is to be determined by the appended claims.

What I claim is:

1. In a machine, a base member and a slide member reciprocable thereon, one of said members having two bearing surfaces disposed at an angle to each other, both said bearing surfaces extending longitudinally in the direction of reciprocation of said slide member, a rotatable rod and a set of anti-friction bearings interposed between said bearing surfaces and the other of said members, said rod and said set of anti-friction bearings extending in the direction of reciprocation of said slide member, said rod having peripheral curved portions which extend in the direction of reciprocation of said slide member and which engage, respectively, said two bearing surfaces, and said rod having another portion around its periphery formed as an inner raceway for said set of anti-friction bearings, said raceway extending in the direction of reciprocation of said slide member and being curved about an axis extending in the direction of reciprocation of said slide member but eccentric of the axis of rotation of said rod, and means on said other member extending in the direction of reciprocation of said slide member and constituting the outer raceway for said set of anti-friction bearings, said rod being adjustable about its axis of rotation to adjust the position of said slide member on said base member.

2. In a machine, a base member and a slide member reciprocable thereon, one of said members having two bearing surfaces disposed at an angle to each other, both said bearing surfaces extending longitudinally in the direction of reciprocation of said slide member, a rotatable rod and two sets of anti-friction bearings interposed between said bearing surfaces and the other of said members, said rod and said two sets of anti-friction bearings extending in the direction of reciprocation of said slide member, said rod having peripheral curved portions which extend in the direction of reciprocation of said slide member and which engage, respectively, said two bearing surfaces, said surfaces determining the axis of rotation of said rod relative to said one of said members, and said rod having other portions around its periphery formed as two inner raceways for said two sets of anti-friction bearings, respectively, both of said raceways extending in the direction of reciprocation of said slide member, and each said raceway being curved about an axis extending in the direction of reciprocation of said slide member, the rolling centers of the anti-friction bearings being upon rotation of said rod rotatable about another axis which is eccentric of the axis of rotation of said rod, and means on said other member extending in the direction of reciprocation of said slide member and constituting the outer raceway for said two sets of anti-friction bearings, said rod being adjustable about its axis of rotation to adjust the position of said slide member on said base member.

3. In a machine, a base member and a slide member reciprocable thereon, one of said members having two bearing surfaces disposed at an angle to each other, both said bearing surfaces extending longitudinally in the direction of reciprocation of said slide member, a rod and two sets of anti-friction bearings interposed between said bearing surfaces and the other of said members, said rod and said two sets of anti-friction bearings extending in the direction of reciprocation of said slide member, said rod having peripheral portions which are curved about a common axis extending in the direction of reciprocation of said slide member and which engage, respectively, said two bearing surfaces, and said rod having other portions around its periphery formed as two inner raceways for said two sets of anti-friction bearings, respectively, both of said raceways extending in the direction of reciprocation of said slide member, and each being curved about an axis extending in the direction of reciprocation of said slide member but eccentric of the first-named axis, and means on said other member extending in the direction of reciprocation of said slide member and constituting the outer raceways for said two sets of anti-friction bearings, said rod being adjustable about said first-named axis to adjust the position of said slide member on said base member.

4. In a machine, a base member and a slide member reciprocable thereon, one of said members having two bearing surfaces disposed at an angle to each other, both said bearing surfaces extending longitudinally in the direction of reciprocation of said slide member, a rotatable rod and two sets of anti-friction bearings interposed between said bearing surfaces and the other of said members, said rod and two sets of anti-friction bearings extending in the direction of reciprocation of said slide member, said rod having peripheral curved portions which extend in the direction of reciprocation of said slide member and which engage, respectively, said two bearing surfaces, and said rod having other portions around its periphery formed as two inner raceways for said two sets of anti-friction bearings, respectively, both of said raceways extending in the direction of reciprocation of said slide member, and each said raceway being curved about an axis extending in the direction of reciprocation of said slide member but eccentric of the axis of rotation of said rod, and means on said other member extending in the direction of reciprocation of said slide member and constituting the outer raceways for said two sets of anti-friction bearings, said raceways being so disposed that said bearings describe a cylinder upon rotation of said rod, the axis of said cylinder being offset from the axis of rotation of said rod, said rod being adjustable about its axis of rotation to adjust the position of said slide member on said base member.

5. In a machine, a base member and a slide member reciprocable thereon, said slide being formed with two bearing surfaces disposed at an angle to each other, both said bearing surfaces extending longitudinally in the direction of reciprocation of said slide member, a rotatable rod and two sets of anti-friction bearings interposed between said bearing surfaces and said base, said rod and said two sets of anti-friction bearings extending in the direction of reciprocation of said slide member, said rod having curved portions extending in the direction of reciprocation of said slide member and which engage, respectively, said two bearing surfaces, and said rod having other portions around its periphery formed as two inner raceways for said two sets of anti-friction bearings, respectively, both of said raceways extending in the direction of reciprocation of said slide member, and each said raceway being curved about an axis extending in the direction of reciprocation of said slide member but eccentric of the axis of rotation of said rod, and said base being formed with a cylindrical bearing surface extending in the direction of reciprocation of said slide member and constituting the outer raceways for said two sets of anti-friction bearings, said raceways being so disposed that said bearings describe a cylinder upon rotation of said rod, the axis of said cylinder being offset from the axis of rotation of said rod, said rod being adjustable about its axis of rotation to adjust the position of said slide member on said base member.

6. In a machine, a base member and a slide member reciprocable thereon, said slide member having two bearing surfaces disposed at a right angle to each other and extending longitudinally in the direction of reciprocation of said slide member, a rotatable, substantially cylindrical rod and two sets of anti-friction bearings interposed between said bearing surfaces and said base, said rod and said two sets of anti-friction bearings extending in the direction of reciprocation of said slide member, said rod having peripheral cylindrical portions extending in the direction of reciprocation of said slide member and which engage, respectively, said two bearing surfaces, and said rod having other portions around its periphery formed as inner raceways for said two sets of anti-friction bearings, respectively, both of said raceways extending in the direction of reciprocation of said slide member, and each said raceway being curved about an axis extending in the direction of reciprocation of said slide member but eccentric of the axis of rotation of said rod, and means on said base extending in the direction of reciprocation of said slide member and constituting the outer raceways for said two sets of anti-friction bearings, said raceways being so disposed that said bearings describe a cylinder upon rotation of said rod, the axis of said cylinder being offset from the axis of rotation of said rod, said rod being adjustable about its axis of rotation to adjust the position of said slide member on said base member.

7. The structure of claim 6, said rod being formed with a pair of axially extending slots of different depths in said cylindrical surface to provide said inner raceways for said respective sets of bearings, all of the bearings in a single set having the same diameter, and the diameters of the bearings in said two sets being different.

8. In a machine, a base member and a slide member reciprocable thereon, one of said members having two bearing surfaces disposed at an angle to each other, both of said bearing surfaces extending longitudinally in the direction of reciprocation of said slide member, a rotatable rod and two sets of anti-friction bearings interposed between said bearing surfaces and the other of said members, said rod being formed over a part of its circumference with a cylindrical surface and over another part of its circumference with another cylindrical surface, said cylindrical surfaces having their axes disposed in offset, parallel relation, said rod, including said axes and its axis of rotation, and said two sets of anti-friction bearings extending in the direction of reciprocation of said slide member, said rod having peripheral portions of one said cylindrical surface engaging, respectively, said two bearing surfaces, and said rod having other portions around its periphery on said other cylindrical surface formed as two inner raceways for said two sets of anti-friction bearings, respectively, both of said raceways extending in the direction of reciprocation of said slide member, and each being curved about an axis extending in the direction of reciprocation of said slide member but eccentric of the axis of rotation of said rod, and means on the other member extending in the direction of reciporcation of said slide member and constituting the outer raceway for said two sets of anti-friction bearings, said rod being adjustable about its axis of rotation to adjust the position of said slide member on said base member.

9. In a machine, a base member and a slide member reciprocable thereon, said base having two bearing surfaces disposed at an angle to each other, both of said bearing surfaces extending longitudinally in the direction of reciprocation of said slide member, a rotatable rod and two sets of anti-friction bearings interposed between said bearing surfaces and said slide member, said rod being formed over a part of its circumference with a cylindrical surface and over another part of its circumference with another cylindrical surface, said cylindrical surfaces having their axes disposed in offset, parallel relation, said rod, including said axes and its axis of rotation, and said two sets of anti-friction bearings extending in the direction of reciprocation of said slide member, said rod having peripheral portions of one said cylindrical surface engaging, respectively, said two bearing surfaces, and said rod having other portions around its periphery on said other cylindrical surface formed as two inner raceways for said two sets of anti-friction bearings, respectively, both of said raceways extending in the direction of reciprocation of said slide member, and each being curved about an axis extending in the direction of reciprocation of said slide member but eccentric of the axis of rotation of said rod, and means on said slide member extending in the direction of reciprocation of said slide member and constituting the outer raceways for said two sets of anti-friction bearings, said rod being adjustable about its axis of rotation to adjust the position of said slide member on said base member.

10. In a machine, a base member and a slide member reciprocable thereon, said base member having two bearing surfaces disposed at a right angle to each other, both of said bearing surfaces extending longitudinally in the direction of reciprocation of said slide member, a rotatable rod formed over a part of its circumference with a cylindrical surface and over another part of its circumference with another cylindrical surface, said cylindrical surfaces having their axes disposed in offset, parallel relation, said rod, including said axes and its axis of rotation, extending in the direction of reciprocation of said slide member, said rod having peripheral portions of one said cylindrical surface engaging, respectively, said two bearing surfaces of said base, two sets of anti-friction bearings disposed on said rod and extending in the direction of reciprocation of said slide member, said rod having other portions around its periphery of said other cylindrical surface formed as two inner raceways for said two sets of anti-friction bearings, respectively, both of said raceways extending in the direction of reciprocation of said slide member, and each being curved about an axis extending in the direction of reciprocation of said slide member but eccentric of the axis of rotation of said rod, a pair of cylindrical rods mounted on said slide and extending in the direction of reciprocation of said slide and engaged, respectively, against said sets of anti-friction bearings, portions of the surface of each said cylindrical rod constituting the outer raceways for said two sets of anti-friction bearings, said first-named rod being adjustable about its axis of rotation to adjust the position of said slide member on said base member.

No references cited.